3,513,049
GLASS FIBER TREATMENT FOR ELASTOMERIC REINFORCEMENT AND COMPOSITIONS
Alfred Marzocchi, Cumberland, R.I., assignor to Owens-Corning Fiberglas Corporation, a corporation of Delaware
Filed Oct. 28, 1965, Ser. No. 505,564
Int. Cl. B29h 9/02; D04h 3/08; C03c 25/02
U.S. Cl. 156—180               8 Claims

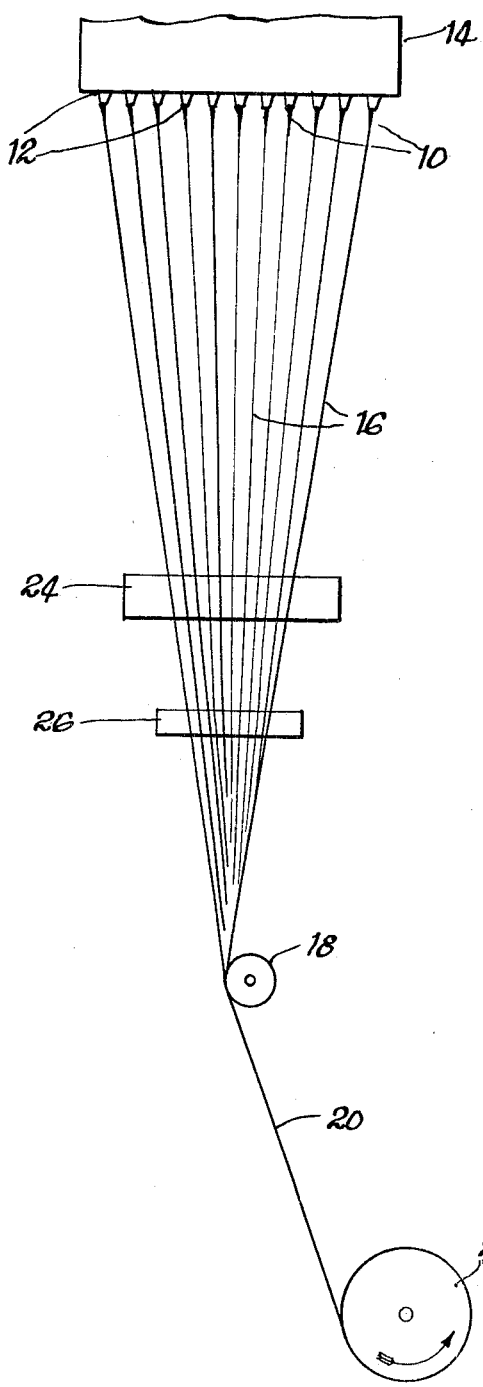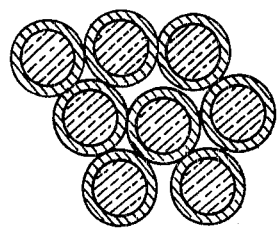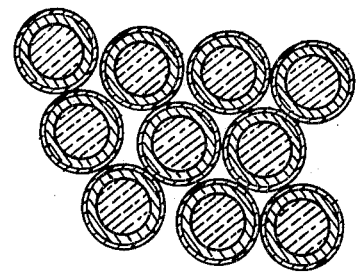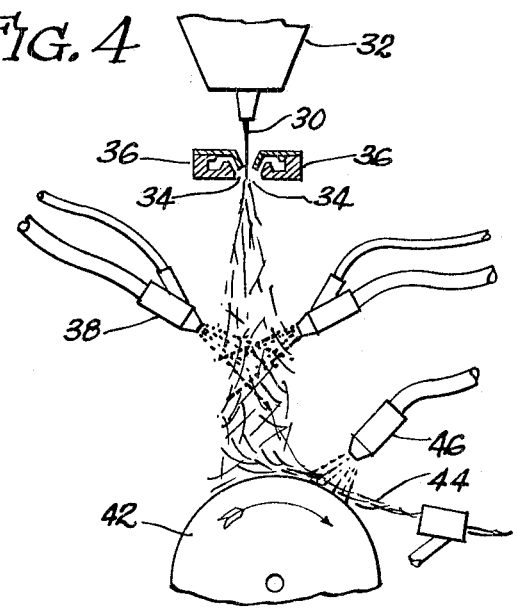
FIG. 1
FIG. 2
FIG. 3
FIG. 4
INVENTOR
Alfred Marzocchi
by Staelin and Overman
Attys United States Patent Office 3,513,049
Patented May 19, 1970

ABSTRACT OF THE DISCLOSURE

In the treatment of glass fibers to enhance their bonding relationship when used as a reinforcement for elastomeric materials in the manufacture of glass fiber-elastomeric products, wherein the individual glass fibers are treated in forming with a size composition containing an elastomeric component, the treatment of the sized glass fibers with a coagulant to set the elastomeric material on the glass fiber surfaces or with a non-solvent to prevent seizure of the glass fibers during processing to the form desired for use as a reinforcement.

This invention relates to the treatment of glass fibers to prepare the glass fibers for processing into strands, yards, cords, threads or fabrics and to prepare the glass fibers for better performance when combined with elastomeric materials in the manufacture of glass fiber reinforced elastomeric products.

To the present, in the processing of glass fibers, a glass fiber size is applied to the surfaces during the glass fiber forming operation. The size operates to protect and to lubricate the glass fibers during processing into strands, yarns, cords or fabrics. Such glass fiber size, applied in forming, has been formulated of dextrinized starch, polyvinyl acetate and the like film forming materials and a glass fiber lubricant present in an amount to provide the desired balance between lubricity and bonding to enable the glass fibers to be processed in the normal gathering, twisting, plying and weaving operations into glass fiber yarns, cords, threads or woven fabrics, hereinafter referred to as glass fiber bundles.

In the absence of a size coating, glass fibers would be destroyed by mutual abrasion during relative movement between the fibers as invariably occurs during such processing operations and the glass fibers would be incapable of the amount of relative movement required for the processing of the fibers into such glass fiber bundles.

Glass fibers which have been processed to the form desired for use in combination with elastomeric materials are incapable of providing full utilization of the high strength and other desirable properties of the glass fibers to the elastomer by reason of the inability to develop a strong and permanent bonded relationship between the glass fiber surfaces and the elastomeric material. The difficulties in the establishment of a desirable bonded relationship between the glass fiber component and the continuous phase of elastomeric materials stems, at least in part, from the inability to effect a strong physical bond between the elastomeric material and the perfectly smooth, non-porous glass fibers, and, at least in part, from the fact that the elastomeric materials are incapable of a strong and permanent bonded relationship with the hydrophilic surface of the glass fibers whereby a water film forms on the glass fiber surfaces in the presence of moisture or high humidity to separate the elastomeric material from the glass fiber surfaces.

These difficulties have been reduced somewhat by the use of an anchoring agent, such as an amine silane, as represented by gamma-aminopropyltriethoxy silane, as a component of the glass fiber size or as a separate coating on the glass fiber surfaces to interbond or intertie the elastomeric material with the sized glass fibers. Such anchoring agent is preferably employed as a separate coating after the original size has been removed from the glass fiber surfaces as by burning off or washing.

A more successful solution has been the impregnation of the bundles formed of the sized glass fibers with a composition containing an elastomeric material which preferably is compatible with the elastomer forming the continuous phase or matrix of the glass fiber-elastomeric product. The theory here is to impregnate the bundle of glass fibers with an elastomeric material to coat the individual fibers for separation of the fibers one from another with a resilient cushioning effect to prevent fiber destruction while simultaneously enabling relative movements for realignment of the fibers in the direction of stress for greater strength and also to provide an elastomeric component integrated into the glass fiber bundle whereby the entire bundle becomes tied into the elastomer of the continuous phase during the subsequent curing or vulcanizing operation. For a fuller description of the technique of impregnation and compositions, reference can be made to my copending applications Ser. No. 397,956, filed Sept. 21, 1964, entitled "Glass Fiber Reinforced Elastomers"; Ser. No. 398,305, filed Sept. 22, 1964, entitled "Glass Fiber Reinforced Elastomers," and Ser. No. 400,517, filed Sept. 30, 1964, entitled "Glass Fiber Reinforced Elastomers."

While the impregnation of the glass fiber bundle constitutes an improvement in the ability to make fuller utilization of the desirable properties of the glass fibers in the ultimate glass fiber-elastomeric product, maximum benefits are not achieved by such impregnation techniques because of the inability to load sufficient of the elastomeric impregnant into the glass fiber bundle by commercially practical impregnation techniques and the difficulty in achieving full impregnation to coat all of the fibers making up the glass fiber bundle.

It is conceivable that the desired amount of elastomeric material might be loaded onto the glass fiber surfaces and that each of the glass fibers making up the bundle could be individually provided with a protective and cushioning coat of elastomeric material if it were possible to coat the individual glass fibers during the glass fiber forming operation or before the glass fiber filaments have been gathered together into a strand or bundle.

The coating of the individual glass fiber filaments with a size composition embodying an elastomeric component has not been possible from the technical standpoint because of the tendency for the elastomeric component of the size coating to stick and to cause seizure between the fibers and prevent relative movements of the type necessary for processing into bundles strands, yarns, cords or fabrics.

It is an object of this invention to provide glass fibers sized with a composition containing an elastomeric component whereby the individual glass fibers can be coated with the elastomeric material; whereby the glass fibers can be loaded with increased amounts of elastomeric coating; whereby the elastomeric coating is present in the innermost regions of the bundle formed of the coated glass fibers for more complete integration of the glass fiber bundle with the continuous phase or matrix of rubber material in the glass fiber-elastomeric product; but in which the glass fiber filaments can be processed by the normal gathering, twisting, plying and weaving operations into strands, yarns, cords or fabrics, and it is a related object to provide glass fiber bundles formed of such sized glass fibers and to provide a glass fiber size composition for use in the manufacture of same.

These and other objects and advantages of this invention will hereinafter appear and for purposes of illustration, but not of limitation, an embodiment of the invention is shown in the accompanying drawing in which—

FIG. 1 is a schematic elevational view of a glass fiber forming process which may be employed in the practice of this invention;

FIG. 2 is an enlarged sectional view through a portion of a glass fiber bundle prepared in accordance with the practice of this invention;

FIG. 3 is an enlarged cross-sectional view of a portion of the glass fiber bundle embodying a modification of this invention; and FIG. 4 is a schematic elevational view of the arrangement of elements for the production of yarns of staple glass fibers in accordance with the practice of this invention.

As used herein, the term "glass fibers" is meant to refer to glass fiber filaments in the form of continuous glass fibers and to strands, yarns, cords, threads and fabrics formed thereof, and to glass fiber filaments in the form of staple glass fibers and yarns, cords and fabrics formed thereof, and strands, yarns, cords and fabrics formed of combinations of continuous and staple glass fibers.

Continuous glass fibers are formed, as illustrated in FIG. 1, from a multiplicity of strands 10 of molten glass issuing from nozzles 12 on the bottom side of a glass melting furnace 14. The molten streams of glass are rapidly attenuated into fine glass fiber filaments 16 which are gathered together by a gathering roll 18 or pad to form the multiplicity of glass fibers into a strand 20 which is wound about a rapidly rotating winding drum 22. The amount of attenuation is controlled, in part, by the circumferential speed of the pulling drum 22.

The strands 20, containing hundreds of filaments of glass fibers, can be used as such for reinforcement but a number of such strands are usually intertwisted and plied into yarns, cords or threads and otherwise processed into woven or unwoven fabrics.

Staple glass fibers comprise discontinuous glass fibers which are formed, as illustrated in FIG. 4, by the rapid attenuation of a multiplicity of molten streams 30 of glass issuing gravitationally from apertures in the bottom side of a glass melting bushing 32. The molten streams of glass are rapidly attenuated into fine discontinuous filaments by high pressure streams 34 of air or steam directed angularly downwardly from nozzles 36 into engagement with the molten streams of glass to cause the attenuation thereof. The discontinuous fibers 38 are allowed to fall gravitationally or in an air stream downwardly through the forming hood onto a foraminous collecting belt or drum 42 on which the collected fibers are gathered together into a sliver 44 which is subsequently processed, as by drafting into a yarn or bundle for subsequent processing, if desired, into cords or threads or into woven or unwoven fabrics.

An important concept of this invention resides in the sizing of the individual glass fibers before they are gathered together in strand or yarn formation to coat the individual fibers making up the strand or yarn with a size composition formulated to contain an elastomeric component and subsequent treatment of the sized glass fibers to coagulate the elastomeric material in the coating. Coagulation to set the elastomeric material can be effected after the sized glass fibers have been gathered together in strand or yarn formation but it is preferred to treat the sized glass fibers to bring about coagulation of the elastomeric material before the individual glass fibers have been gathered together into the strand or yarn.

Coagulation of the elastomer in the coating applied to the glass fibers operates to set the coating on the glass fiber surfaces in a manner to minimize drainage whereby a greater amount of coating will be retained by the coated glass fibers. This advantageously operates to increase the amount of elastomer that can be loaded into the glass fiber bundle.

Coagulation of the elastomer in the coating applied to the glass fiber surfaces operates also advantageously to prevent squeezing out of coating composition when the fibers are forcibly brought together into the strand or yarn or subsequently processed into cords, threads, or fabrics or other glass fiber bundles. Thus the coating is retained in substantially uniform distribution and amount throughout the glass fiber bundle wherein the elastomeric component can operate to cushion the fibers one from another thereby not only to protect the glass fibers from destruction by abrasion but also to enhance maximum utilization of the strength properties of the glass fibers in the elastomeric product. Distribution of the elastomeric material throughout the formed glass fiber bundle operates also advantageously to key the entire mass of glass fibers making up the bundle into the elastomeric system of the glass fiber-elastomeric product thereby to tie in the glass fiber system with the elastomer.

Finally, coagulation of the elastomer in the size coating operates to reduce tack of the elastomeric component whereby the fibers can more easily be processed into strands, yarns, cords or fabrics with less seizure between the fibers in resistance to relative movements.

A size composition embodying an elastomeric component for use in coating the individual glass fiber filaments in forming can be illustrated by the following:

EXAMPLE 1

| | Percent by weight |
|---|---|
| Rescorcinol formaldehyde resin (38% by weight solids) | 10 |
| Natural rubber latex (50% by weight solids) | 5 |
| Anchoring agent (gamma-aminopropyltriethoxy silane) | 0.5 |
| Water | 84.5 |

EXAMPLE 2

| | |
|---|---|
| Resorcinol formaldehyde resin (38% by weight solids) | 10 |
| Natural rubber latex (50% by weight solids) | 5 |
| Anchoring agent (gamma-aminopropyltriethoxy silane) | 0.5 |
| Glass fiber lubricant (cationic amine such as pelargonate amide solubilized with acetic acid) | 1 |
| Water | 83.5 |

EXAMPLE 3

| | |
|---|---|
| Natural rubber latex-resorcinol formaldehyde resin dispersed in aqueous medium at 40% solids (Lotol 4150) | 15 |
| Amino silane anchoring agent | 3 |
| Water | 82 |

EXAMPLE 4

| | Parts by weight |
|---|---|
| Resorcinol formaldehyde resin (37% solids) | 2–10 |
| Formaldehyde (31% solution) | 1–3 |
| Ammonium hydroxide | 2–5 |
| Vinyl pyridine terpolymer latex (42% solids) | 15–50 |
| Neoprene rubber latex (50% solids) | 25–50 |
| Butadiene latex (60% solids) | 5–15 |
| Alkali metal hydroxide | .05–.2 |
| Anchoring agent | .1–3 |
| Water | 1100 |

EXAMPLE 5

| | |
|---|---|
| Neoprene rubber | 100 |
| Powdered magnesium oxide | 4 |
| Powdered zinc oxide | 5 |
| Carbon black | 15 |
| Anchoring agent | 2 |
| Toluene | 1400 |

In Examples 1–4, it is preferred, though not essential, to effect stabilization of the system by the addition of a quaternary ammonium hydroxide, such as tetramethyl ammonium hydroxide in an amount corresponding to about 10% weight of the anchoring agent.

The size composition is applied to the individual glass fiber filaments 16 by a roller coater 24, a portion of which is immersed in a bath of the size composition housed in a suitable container. Instead, the size composition can be applied by conventional means, such as by means of a stationary wiping pad which is continuously being wet with the size composition.

Instead of the natural rubber latex or neoprene latex, the size compositions can be formulated of other elastomeric materials as an aqueous latex or in a solvent solution including for example, such synthetic elastomeric materials as butadiene-acrylonitrile copolymer, butadiene-styrene copolymer, isoprene, chloroprene, and the like, alone or in combination with a resinous material, such as the resorcinol formaldehyde resin. The amount of latex can be varied depending somewhat upon the resulting viscosity of the size composition.

Instead of gamma-aminopropyltriethoxy silane as the anchoring agent, use can be made of other organo silicon compounds in which the organic group attached to the silicon atom contains an amino group, such as gamma-aminovinyldiethoxy silane, gamma(triethoxysilylpropyl amide) propylamine, N(gamma-triethoxysilylpropyl) propylamine, beta - aminoallyltriethoxysilane, and para-aminophenoltriethoxy silane. Use can be made of other organo silicon compounds in the form of a silane, silanol or polysiloxane in which the organic group attached to the silicon atom contains the described amine group or else contains an epoxy group such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, β-alanine chromic complex, or glycylato chromic chloride. Such anchoring agents may be employed in an amount within the range of 0.05 to 3 percent by weight of the size composition.

The anchoring agent can be applied from solution as a coating separate and apart from the size composition containing the elastomeric component. When separately applied, it is preferred to coat the glass fibers first with the anchoring agent and then with the latex size.

Before the fibers are gathered together into strands or yarns or as soon thereafter as possible, the fibers are wet with a rubber coagulant, such as a long chain aliphatic sulfate, a long chain aliphatic sulfonate, or an acidic compound such as a dilute solution of phosphoric, nitric, acetic, citric, hydrochloric or the like organic or inorganic acid, as represented by the following examples:

EXAMPLE 6

| | Parts by weight |
|---|---|
| Stearyl sulfate | 5 |
| Solvent | 94.75 |
| Sulphuric acid | 0.25 |

EXAMPLE 7

| | |
|---|---|
| Acetic acid | 3 |
| Water | 96.75 |
| Hydrochloric acid | 0.25 |

EXAMPLE 8

| | |
|---|---|
| Octadecyl sulfonate | 4 |
| Water | 95.7 |
| Sulphuric acid | 0.30 |

The coagulant liquid is applied in FIG. 1 by a roller coater 26 or, as shown in FIG. 4, it can be applied by a spray nozzle 46 onto the fibers after the fibers have been gathered together in the bundle or while the fibers are being collected into the bundle.

Thereafter, the bundle of sized glass fibers can be processed into yarns, cords, or fabrics and combined with the continuous phase of the elastomer for molding under heat and pressure to cure or vulcanize the materials into the final glass fiber-elastomeric product.

By way of modification, instead of coagulation, or in addition thereto, improved slip between the glass fibers coated with the size composition containing the elastomeric component can be achieved by introduction of an incompatible solvent onto the coated fibers or into the bundle of glass fibers which have previously been sized with a composition of the type described. For this purpose, use can be made of a solvent which is incompatible with the elastomer, such as kerosene, petroleum ethers and the like hydrocarbons.

In use, the incompatible solvent can be sprayed onto the sized glass fibers in forming. It can be applied by a roll applicator or applicator pad, as illustrated for the application of the coagulant liquid in FIG. 1 of the drawing. It can be sprayed into the mat of sized fibers or sliver formed thereof as illustrated by the spray gun 46 for application of the coagulant in FIG. 4 of the drawing. Beneficial results are secured from fogging of the incompatible solvent in close vicinity to the bundle of glass fibers during processing as by winding, twisting, plying or weaving.

The presence of the incompatible solvent on the sized glass fibers operates not only to reduce tack but it beneficially functions also to lubricate the fibers during processing, such as in winding, twisting, plying or weaving.

The incompatible solvent, while present on the glass fiber surfaces, operates also to minimize interbonding between the fibers or interadhesion between the bundle of sized glass fibers thereby to permit coating of the fibers to be carried out on the wheel pullers used in fiber attenuation. It minimizes interbonding of the glass fibers when deposited in a collecting basket and it operates to prevent migration of water-borne materials throughout the forming tube upon which the glass fibers are mounted.

It is preferred to formulate the size composition with a film forming resinous material in addition to the elastomeric component. For this purpose, it is preferred to make use of a resorcinol formaldehyde resin as in the illustrated formulations. It is believed that the beneficial use resulting from the resorcinol formaldehyde resin stems from the polarity contributed by the additional hydroxy group or groups of the formed methylol. Such polarity enhances the bonding to similar groups present in the surface of the glass fibers or made available from the organo silane employed as the anchoring agent. Similar results are available from the use of other condensation resin forming materials such as phenol formaldehyde resins, cresol aldehyde resins, resorcinol aldehyde resins, alanine aldehyde resins, urea aldehyde resins, guanine aldehyde resins, and other resins formed by condensation through formed methylol groups.

From the theoretical standpoint, it is believed that encompassing of the latex by the polymer of the resorcinol formaldehyde occurs to leave a place for the elastomer to tie in with other rubbers during cure.

Also the double bonds or ethylenic groups of the unsaturated elastomer forming materials are capable of reaction with phenol and methylol groups which add to the double bonds to form ether linkages, especially where active hydrogen groups are present. Thus the unsaturated rubber forming materials tie in to the methylol groups of the partially condensed condensation resins to form common ether compounds.

Still further, bonding between the hydrogen of the hydroxy group and sulphur used in vulcanization of the rubber can be achieved to intertie the phenol or resorcinol aldehyde resin with the vulcanized elastomer.

It will be sufficient if the film forming resinous material is present in the ratio of one part by weight elastomer to .5 to 5 parts by weight of the resin but it is preferred to make use of the materials in the ratio of one part by weight of elastomer to .5 to 2 parts by weight of the resin.

The fiber bundles prepared in accordance with the practice of this invention can be combined with the elastomer of the continuous phase and molded under heat and pressure to vulcanize or cure the elastomer to produce a glass fiber-elastomeric product in which substantially full utilization is made of the strength and other desirable characteristics of the glass fibers by reason of the strong interconnection between the glass fiber component and the elastomer of the continuous phase. During such cure or vulcanization, the elastomeric component uniformly distributed throughout the glass fiber bundle as a part of the size composition tends to react to perform a part of the continuous phase of elastomeric material whereby the glass fiber component becomes integrated through the elastomeric component of the size into the composite system.

It will be understood that changes may be made in the details of construction and formulation and application of the treating compositions without departing from the spirit of the invention, especially as defined in the following claims.

I claim:

1. In the method of processing glass fibers for use in the reinforcement of elastomeric materials in the manufacture of glass fiber-elastomeric products, the steps of completely coating the glass fibers while in their individual state with a glass fiber coating composition containing a coagulatable rubbery polymeric component in an uncured state and coagulating the elastomeric rubbery polymeric material in the coating after the fibers have been coated but before the coating has dried to set the coating on the glass fiber surfaces.

2. In the method of processing glass fibers for use in the reinforcement of elastomeric materials in the manufacture of elastomeric products reinforced with bundles of glass fibers, the steps of coating individual glass fibers with a glass fiber coating composition containing a coagulatable rubbery polymeric component in an uncured state, wetting the coated glass fibers with a coagulant to coagulate the rubbery polymeric component in the coating after the fibers have been coated but before the coating has dried, and gathering the fibers together in bundle formation.

3. The method as claimed in claim 2 in which the coagulant is applied to the coated glass fiber surfaces after the fibers have been gathered together into a bundle.

4. The method as claimed in claim 2 in which the coagulant with which the glass fibers are wetted is selected from the group consisting of a long chain aliphatic sulfate, a long chain aliphatic sulfonate and an acidic material.

5. In the method of processing glass fibers for use in the reinforcement of elastomeric materials in the manufacture of elastomeric products reinforced with bundles of glass fibers, the steps of coating individual glass fibers with a glass fiber coating composition containing a rubbery polymeric component and wetting the coated glass fibers with an organic solvent that is incompatible with the rubbery polymeric material immediately prior to processing as defined below to reduce the tack and increase the lubricity to permit relative movements between the coated glass fibers during processing into glass fiber bundles, and processing the coated glass fibers to form the fibers into bundles while the surfaces are wet with the incomparable organic solvent.

6. The method as claimed in claim 5 in which the sized glass fibers are wet with the incompatible solvent before the fibers are gathered together in the bundle.

7. The method as claimed in claim 5 in which the sized glass fibers are wet with the incompatible solvent after the fibers have been gathered together in the bundle.

8. The method as claimed in claim 5 in which the incompatible solvent is a petroluem hydrocarbon.

References Cited

UNITED STATES PATENTS

| | | | |
|---|---|---|---|
| 2,723,211 | 11/1955 | MacMullen et al. | 117—126 |
| 3,135,624 | 6/1964 | Nakane et al. | 117—56 |
| 3,168,389 | 2/1965 | Eilerman | 65—3 |
| 3,215,585 | 11/1965 | Kneipple | 161—170 |
| 3,330,689 | 7/1967 | Ells et al. | 117—76 |
| 3,331,885 | 7/1967 | Rider et al. | 260—826 |
| 3,367,793 | 2/1968 | Atwell | 117—76 |
| 3,369,926 | 2/1968 | Eakins | 117—67 |

OTHER REFERENCES

Winspear, George G.: The Vanderbilt Rubber Handbook, R. T. Vanderbilt Company, Inc., New York, 1958. pp. 238–239.

Barron, Harry: Modern Rubber Chemistry, 1948, D. Van Nostrand Company, Inc., New York, pp. 88–89.

HAROLD ANSHER, Primary Examiner

D. J. FRITSCH, Assistant Examiner

U.S. Cl. X.R.

117—62.2, 63, 80, 126; 156—110